United States Patent [19]

Lai

[11] Patent Number: 4,809,216

[45] Date of Patent: Feb. 28, 1989

[54] PRINT ENGINE DATA INTERFACE

[75] Inventor: Charles Lai, Marlborough, Mass.

[73] Assignee: Digital Equipment Corporation, Maynard, Mass.

[21] Appl. No.: 900,057

[22] Filed: Aug. 25, 1986

[51] Int. Cl.⁴ .............................................. G06F 3/12
[52] U.S. Cl. .................................................... 364/900
[58] Field of Search ... 364/200 MS File, 900 MS File, 364/519, 518; 400/124, 61, 62, 63, 76; 365/222

[56] References Cited

U.S. PATENT DOCUMENTS

| 4,074,254 | 2/1978 | Belser | 365/231 |
|---|---|---|---|
| 4,203,154 | 5/1980 | Lampson | 364/900 X |
| 4,601,018 | 7/1986 | Baum et al. | 365/222 |
| 4,648,032 | 3/1987 | Romero et al. | 365/222 |
| 4,649,513 | 3/1987 | Martin et al. | 364/900 |
| 4,651,278 | 3/1987 | Herzog et al. | 364/900 X |

Primary Examiner—David Y. Eng
Assistant Examiner—Florin Munteanu
Attorney, Agent, or Firm—Nutter, McClennen & Fish

[57] ABSTRACT

A print engine data interface for sequentially accessing locations in a full page bit map for either retrieving the data therein and forwarding it to a print engine for subsequent printing, or for issuing a refresh command to refresh the data. A bit map address counter generates address location in the full page bit map that the print engine data interface accesses. A scan offset adjustment circuit in combination with a refresh and read/write arbitration logic circuit and the bit map address counter are provided so that the print engine data interface only accesses address locations for read/write retrieval that contain printing instructions to be forwarded to the print engine. The bit map locations that do not include printing instructions for forwarding are thus accessed only for refreshing. The print engine data interface further includes a parallel-to-serial converter unit to put the retrieved data in a form so that it can be forwarded in the usable state to the print engine.

13 Claims, 4 Drawing Sheets

PRINT ENGINE DATA INTERFACE

FIELD OF THE INVENTION

This invention relates to print engine drive units such as those adapted to transmit control signals to a print engine from a data processing system. In particular, it relates to a print engine data interface unit for transmitting print command data from a dynamic memory to a print engine, and for refreshing the command data stored in the memory.

BACKGROUND OF THE INVENTION

Much work has been done in the recent years regarding the development of high-speed, high-quality data processing printers. A considerable fraction of this work has gone into the development of laser-type print engines. These print engines have a specially adapted laser with a beam that can be rapidly turned on and off to generate a raster type scan line composed of pixels, or dots, across a photoconductive surface. The adjacent scans of the laser beam are located within close proximity to each other so that when the surface is completely scanned, a full, accurate depiction of the image to be produced is projected on the surface. A paper printout of the image may then be produced by conventional xerographic techniques.

The advantage of using a laser-type print engine is that the pixel density can be quite high. A laser-type print engine can produce 90,000 or more pixels per square inch of output image. This makes it possible to produce figures and characters of extremely high quality, equal to those produced by much slower conventional printers with typewriter type impacting keys. Another advantage laser printers have over conventional printers is that they are not limited to printing only the figures contained on the type keys. The laser beam may be used to form a raster image of almost any combination of pixels desired. This is a desirable feature to have on a printer when printing either a business or technical document that includes irregularly shaped figures such as graph lines or scientific symbols.

One problem with laser printing technology is that large amounts of print command data must be processed by the printing system at a very high rate of speed. This is because it is necessary for the printing system to almost simultaneously receive the output data from the processor to be printed, convert the data into pixel image form readable by the print engine, and transmit the pixel print commands in the appropriate sequence to the print engine so the laser will be activated at the appropriate times as its beam scans along the photoconductive surface.

Thus, it is necessary to provide a data controller that can properly sequence the flow of data from the main processor, convert it to print engine-readable pixel form, and transmit the pixel data to the print engine.

Currently, there are two approaches to data controller design. One approach uses a band buffer where a block of data is received by the controller, converted into pixel form, and stored in a buffer where it can be read by the print engine. A disadvantage of this system is the storage buffer is too small to store all of the pixel data necessary for some complex graph and symbol imagery. Thus, these controllers are of limited utility.

Alternatively, the data controller may have a full page bit memory system. These controllers are provided with at least one full page bit memory map that is representative of the data to be retrieved and for scanning by the print engine. Processing circuitry within the data controller analyzes the input from the main processor to determine if it is either format data, called font data, or actual image composition data. An image generator circuit analyzes the composition data by referring to the font data, and produces a pixel representation of the image to be generated. The pixel output is loaded into the full page bit map memory. The print engine is able to access the full page bit map memory and reproduce on the photoconductive surface the image stored therein. This makes it possible to generate a full page of print output with graphs and other complex figures represented thereon.

Full page bit memory controllers can be rather slow devices because it has proved very difficult to transmit data to one position of the full page bit map and to send data from another section of the bit map at the same time. Also, some image generating systems do not transmit data to the bit map serially. With these systems the engine bit map must be fully composed before it is ready to be accessed by the print engine. If only one bit map is provided, it is necessary to follow a pattern of first loading it with pixel data, and then having the print engine access it. This slows down the operation of both the image generator and the print engine since one must remain idle while the other has access to the bit map. Therefore, it is desirable to provide the data controller with at least two full page bit maps so one may be accessed by the image processor while the other is accessed by the print engine.

Another disadvantage of full page bit memory systems is that they have memory elements that usually need to be refreshed. This is because the typical full page bit memory is a dynamic memory, meaning that the electrical charges in it that represent the data tend to decay over time. This is a problem because data stored early within the print engine will decay and become unuseable before it is accessed by the print engine. Also, this decay makes it almost impossible for the print engine to repeatedly access a bit map thereon or so that multiple copies of the page represented thereon can be printed.

A need therefore exists for a means to control the print engine's access to the bit memory system. The print engine should have access to at least two full page bit map memories so it can have access to one while the image generator has access to the other. Also, there should be a means to access the full page maps so data stored therein is frequently refreshed so as to prevent it from decaying and becoming unreadable.

SUMMARY OF THE INVENTION

The invention comprises providing a print engine data interface circuit that can be selectively connected to one of a number of full page bit maps that provide the print engine with command data. The print engine data interface is designed to access one of the full page bit maps and serially transmit the pixel data contained therein to the print engine. Thus, when two full page bit maps are provided, it is possible to dedicate one of the full page bit maps to the print engine while the other is being loaded with data from the image processor. Both the image processor and the print engine can thus be operated at maximum efficiency in order to generate hard paper copies as fast as possible.

Also, the print engine data interface of this invention is designed to frequently refresh the data stored in the full bit map it has access to. This keeps the data within the memories in an optimal condition so the full page bit map may be repeatedly accessed by the print engine to provide multiple copies of the same output.

The print engine data interface is connected to the print engine, a print bus, and a printer control and status interface. The print bus is connected to at least two full page bit maps. The printer control and status interface is connected to the print engine, the print engine data interface, and the full page bit map memories. It controls the bit map assignments for both the reading to the bit map from the image processor and the access to a bit map by the print engine data interface. The printer control and status interface also directs page geometry parameters to the print engine data interface. The printer control status interface transmits these control signals in response to initial page parameters supplied to it in the terms of formatting information, and in response to status signals generated by the print engine.

The print engine data interface includes a set of command and data registers for storing the page geometry parameters transmitted from the printer control and status information. A scan offset adjustment circuit uses the parameters in the command and data registers to synchronize the retrieval of the pixel data from the full page bit map so that it is synchronous with the demand from the print engine, and to control the length of the memory scan of the memory so it is of an appropriate length to be acceptable with the print engine's requirement for print command data. A bit map sequencer is designed to generate either read/write or refresh control signals to the bit map memory while it is controlled by the print engine data interface. This provides command signals so the memory rows with the full page bit memory are either read or refreshed. The bit map sequencer is controlled by a refresh and read/write arbitration logic circuit.

The print engine drive interface is also provided with a bit map address control circuit for generating a current data address so the correct data can be retrieved by the bit map sequences. The retrieved data is read into a parallel to serial data conversion unit for transmissions to the print engine.

DETAILED DESCRIPTION OF THE PREFERRED EMBODIMENTS

Figure 1:
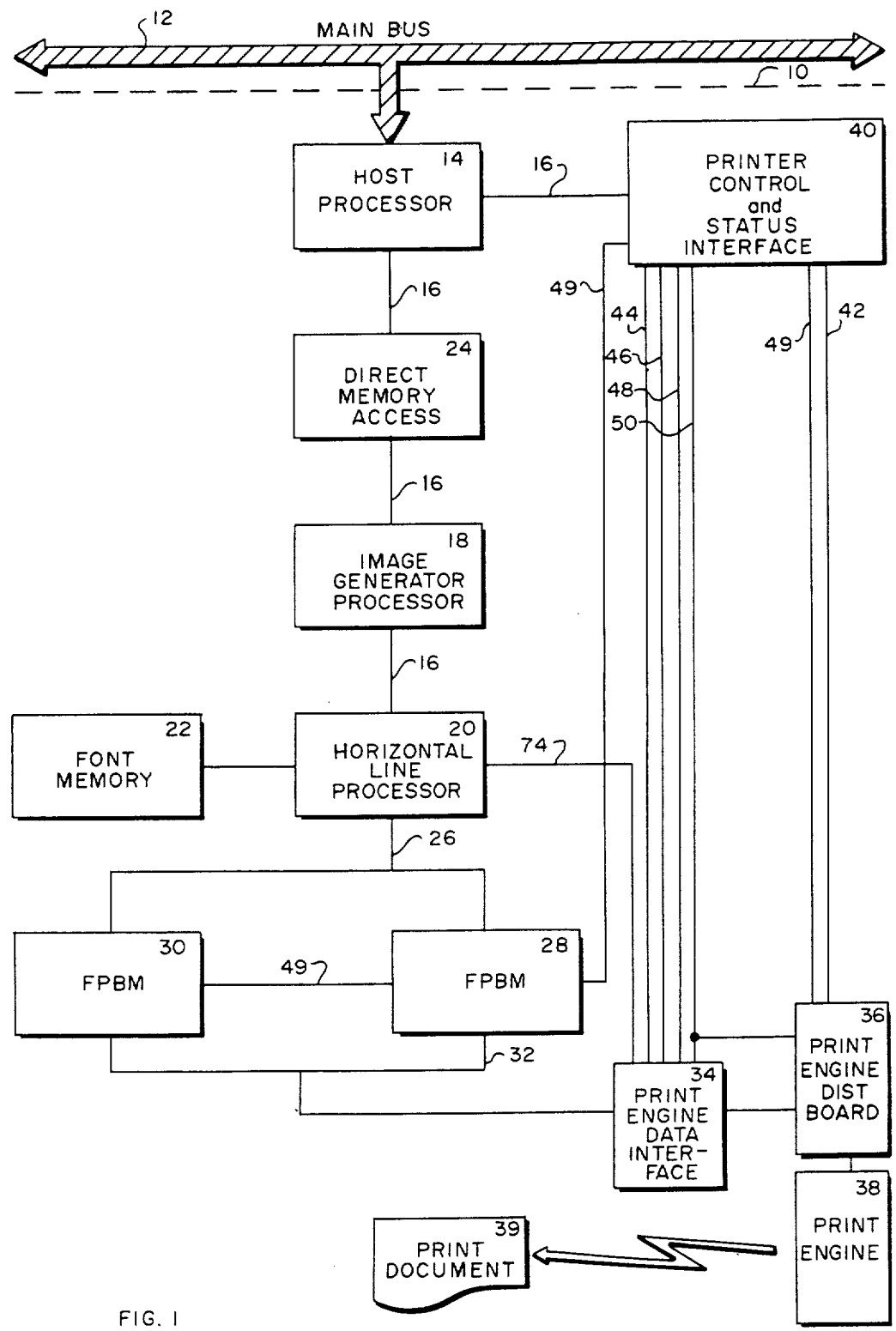
FIG. 1 is a block diagram of a data processing printer system that incorporates the print engine data interface in accordance with this invention.

FIG. 1 depicts in block diagram a print system 10 that is connected to a main processor (not illustrated) through a main bus 12 such as an ethernet line. The system is addressed through a host processor 14 that exercises control over the entire print system. A system bus 16, such as a Q-bus, connects the system together. The host processor initially determines if the print system is being polled, or accessed, by the main processor. If it determined that the print system is being accessed, the host processor then determins whether the incoming packets of data are formatting data, called font data, or actual composition data comprising data to be printed and/or commands, such as line spacing commands. If the incoming data is font data, it is passed through a horizontal line processor 20 to a font memory unit 22. If the data is composition data, it is passed to an image generator processor 18. A direct memory access unit 24 serves as a high speed channel to transfer command and data signals to the image generator processor 18.

The image generator processor 18 responds to a particular packet of composition data by issuing an image command to the horizontal line processor 20. The horizontal line processor in response to the image command, and by reference to the font data, generates a full page bit map address where a pixel should be produced. The bit map address is directed along a composition bus 26 to one of two full page bit maps (FPBM) 28 or 30 that the horizontal line processor selectively accesses. The pixel image is then stored in the selected full page bit map at the address the horizontal line processor generated. When the full page bit map is fully loaded with pixels it is a representation of the page to be produced. This necessitates providing the full page bit maps 28, 30 with a very large amount of memory. In one embodiment of the invention, each is a 1.25 megabyte array, and each bit within each of the arrays represents a potential pixel location.

The full page bit map memories are connected to a print bus 32 that is connected to a print engine data interface (PDI) 34. The print engine data interface 34 is connected to a print engine distribution board 36 that serves as the input-output interface for a print engine 38. The print engine controls the laser and other hardware elements necessary to produce a print document 39.

The transmission of data through the print engine data interface is controlled by a printer control and status interface (PCSI) 40. The printer control and status interface 40 is connected to the host processor by the Q-bus 16, to the print engine through the distribution board by a set of command and status lines 42 and to the print engine data interface 34 by a scan enable, address, and data lines 44, 46, 48, respectively, and to the full page bit map by assignment lines 49. The print engine 38, through the print engine distribution board 36, transmits a line sync across a print engine line sync line 50 wherever it is ready to start a new scan line. The line sync line 50 is connected to both the print engine data interface 34 and the printed control status interface 40. The printer control and status interface 40 also responds to the commands of the host processor 14 by starting and stopping the print engine 38 and by selecting the bus assignments of the full page bit memory maps 28 and 30. It performs these functions by frequently polling the status of the printer and other elements of the system 10 and communicating their status to the host processor.

The print engine data interface 34 addresses the selected full page bit memory 28 or 30 accessed for printing, serially retrieves the pixel data contained therein, and forwards it to the print engine 38 for image processing. The print engine data interface 34 also cyclically refreshes all the data stored in the full page bit memory. This keeps the data fresh and useable by the print engine when it would otherwise decay if the scan line was too short. This also makes it possible to repeatedly scan each full page bit map 28 or 30 so multiple copies of the page may be produced without having to spend time re-composing the page each time.

Figure 2:
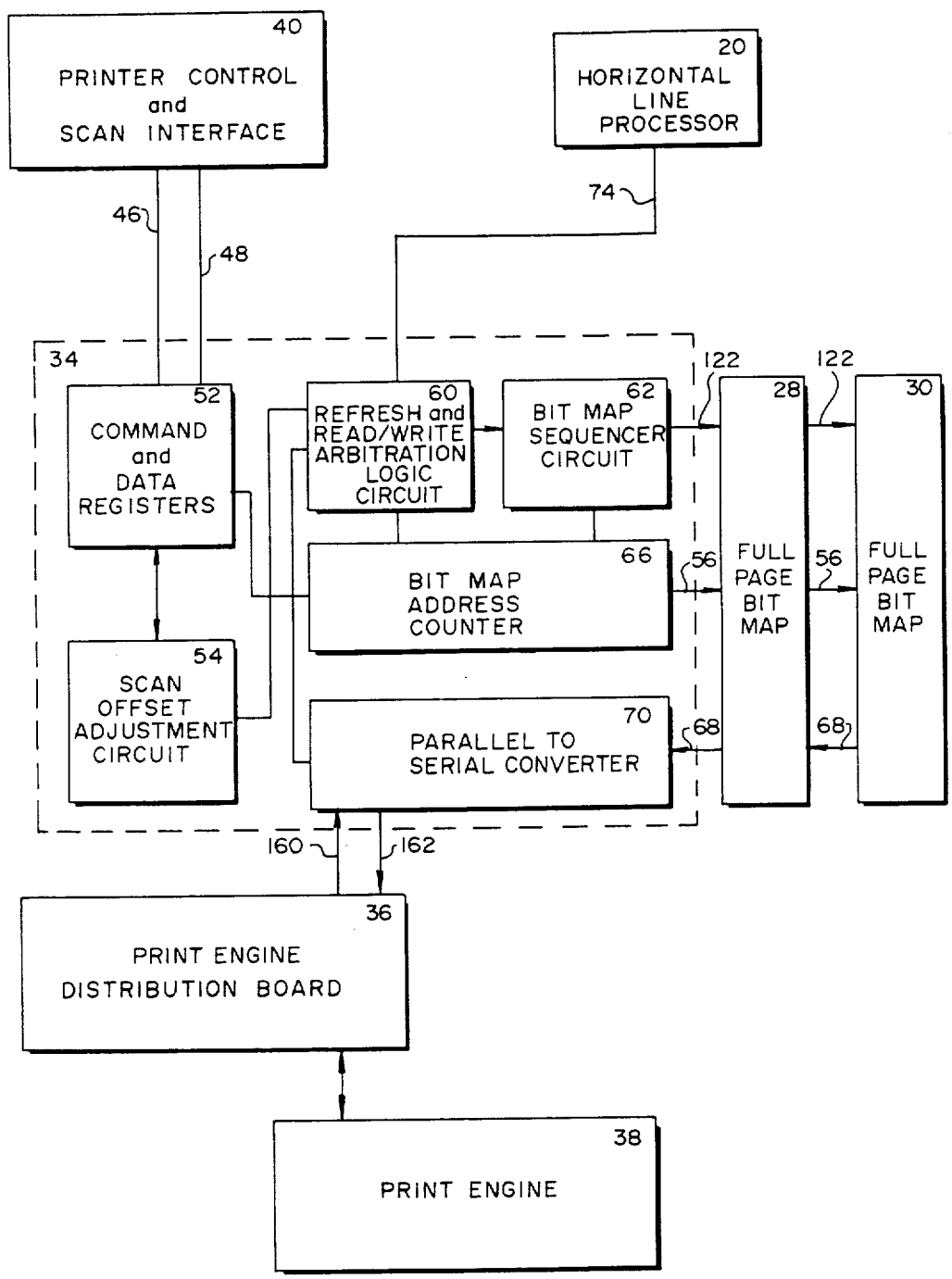
FIG. 2 is a block diagram illustrating the principle components of the print engine data interface.

Referring now to FIG. 2, it is seen that the print engine data interface 34 includes a set of command and data registers 52. These registers are designed to store page geometry parameters, specific to the type of print engine 38 and page format parameters the print engine data interface 34 uses to forward data to data. These parameters are transferred by the printer control and status interface 40 to the registers 52 through PCSI address and PCSI data lines 46, 48. A PCSI scan enable command is also forwarded to these registers 52 through the scan enable line 44. These parameters are referenced by a scan offset adjustments logic circuit 54 to adjust to the proper initial address at the beginning of each line scan.

Read, writing and refreshing of the full bit map memories 28 and 30 is controlled by a refresh and read/write arbitration logic circuit 60. The arbitration logic circuit 60 assigns the proper refresh or read/write commands to a bit map sequencer 62. This enables the bit map control sequencer 62 to generate control signals to either refresh the data in a selected bit map 28 or 30 for reading or retrieve it for transmission to the print engine.

A bit map address counter 66 under command of the refresh and read/write arbitration logic circuit 60, the bit map sequencer 62 and the scan offset adjust circuit 54, is provided to point to the appropriate address in the selected full page bit map 28 or 30 so the correct data can be either refreshed or retrieved. The address is transmitted to the selected bit map 28 or 30 through a set of address lines 56. The retrieved data is read in byte form through a set of eight data lines 68 from the selected page bit map 28 or 30. The data is transferred into a parallel-to-serial converter 70 where it is converted into a serial bit stream for transmission to the print engine distribution bound through a data output line 162.

The horizontal line processor 20 is connected to the print engine data interface 34 through a refresh line 74, connected to the refresh and read/write arbitration logic circuit 60. This refresh signal passed through this line is to synchronize refresh timing during periods when the bit map 28 or 30 accessed by the PDI is not being used to supply print data to the print engine.

Figure 3A:
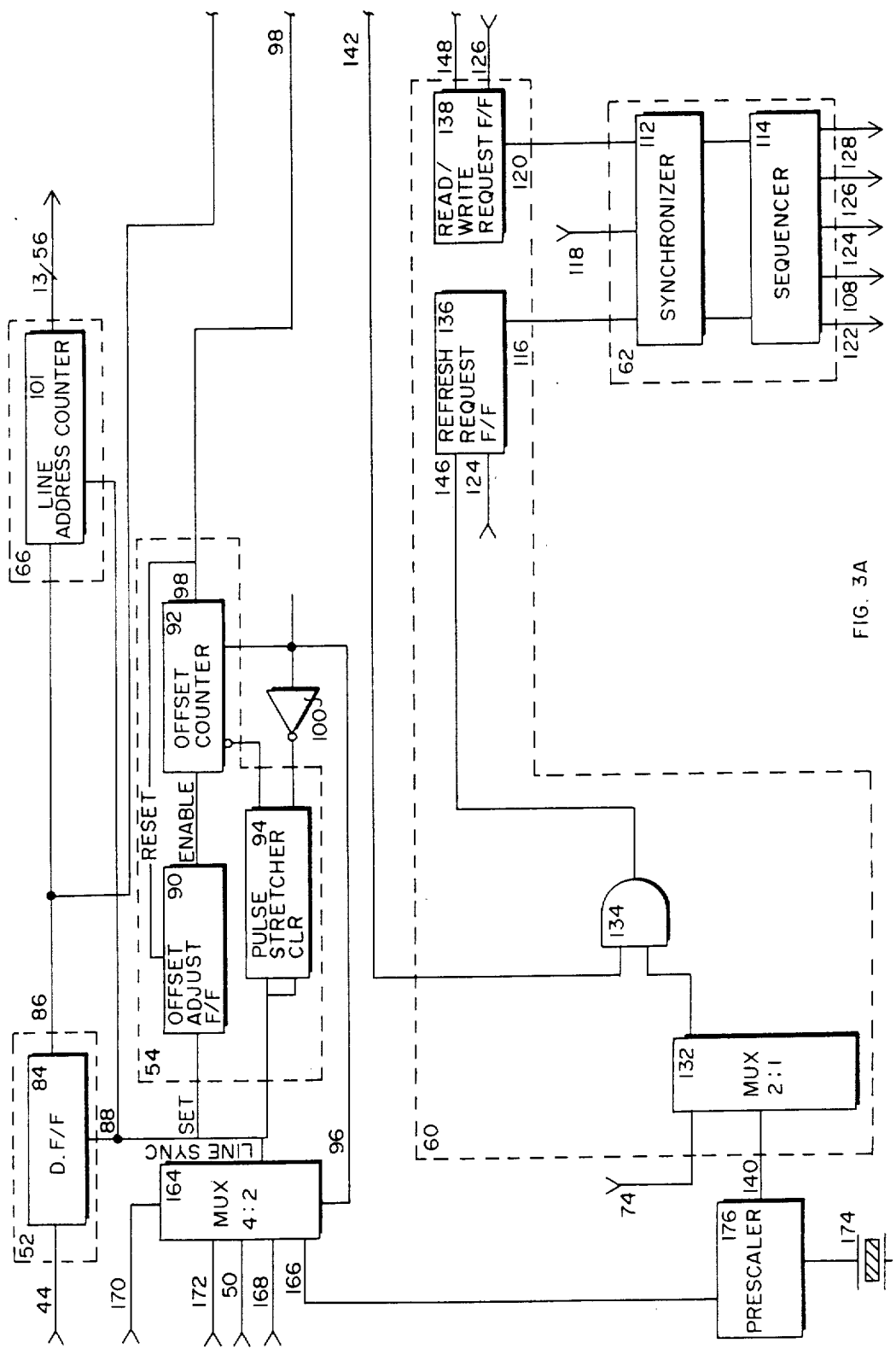
FIGS. 3A and 3C, when assembled, form a schematic diagram of the print engine data interface.
Figure 3B:
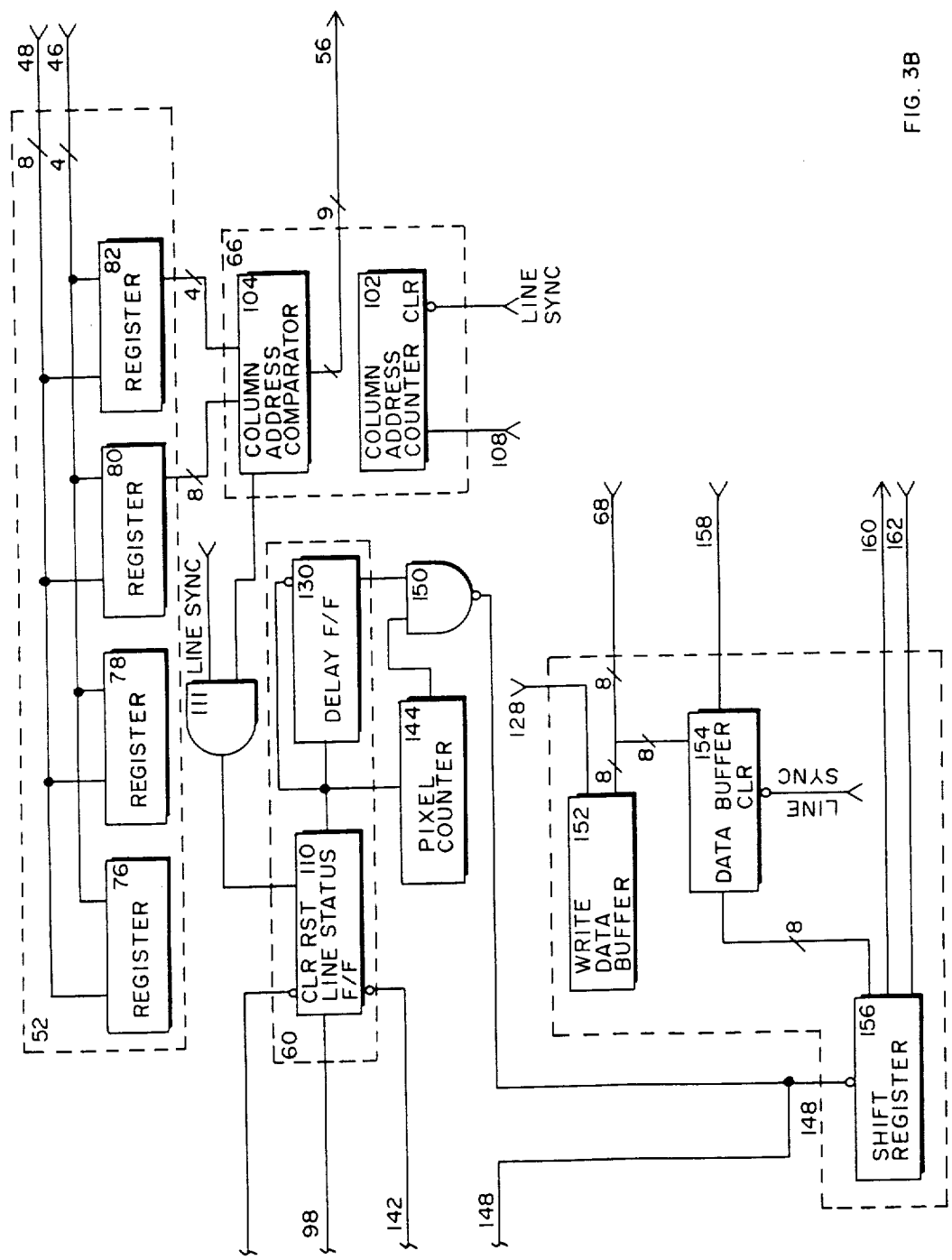

With this background, the print engine data interface 34 is described in more detail by reference to FIG. 3.

The command and data registers 52 consist of four 8-bit registers 76, 78, 80, and 82, respectively, and one D-type flip-flop 84. The page parameters of the scan are assigned to the individual registers as follows:

| REGISTER | | DESCRIPTION |
| --- | --- | --- |
| Register 76 | Bits 4–7 | High 4 bits of scan offset adjustment |
| | Bit 3 | Print Mode Select H-Print L-Print/Erase |
| | Bit 2 | Test-Enable PDI self-test mode |
| | Bits 0–1 | High 2 bits of byte count per scan line |
| Register 78 | Bits 0–7 | Lower 8 bits of scan offset adjustment |
| Register 80 | Bits 0–7 | Lower 8 bits of byte count per scan line |
| Register 82 | Bits 0–7 | Stored byte pattern to be written back to bit map during print/erase mode |

The registers 76–82 are loaded with geometry parameters from the printer control and status interface 40 through the address and data lines 46 and 48 and the flip-flop 84 is triggered by a signal enable from the PCSI 40 through the scan enable line 44. Flip-flop 84 is used to generate a page enable signal along the page enable line 86 and is triggered by the line sync signal 88. The page enable is asserted when the entire frame of a page is synchronous with the line sync, and thus is used as a system reference signal to enable data transfer.

The scan offset adjustment circuit 54 consists of an offset adjust flip-flop 90, an offset counter 92 and a pulse stretcher 94. The scan line registration offset adjustment is made at the beginning of each scan line by loading one's complements of offset count from registers 76 and 78 into the offset counter 92, (connection not shown) and setting the offset adjust flip-flop. The offset adjust flip-flop 90 enables the offset counter 92 which counts engine clock pulses received through an engine clock line 96 as the scan progresses. When the total number of counts equals the count stored, the offset counter 92 generates an offset reset signal on an offset reset line 98. The reset line 98 is branched back to the offset adjust flip-flop 90 so the offset adjust flip-flop 90 is also reset. The pulse stretcher 94, along with an inverter 100, is used to load the offset counter 92 at the beginning of the line with the scan value. The inverter 100 is used to invert the video clock signal from the print engine 38 so sufficient time is provided to load the offset counter 92. Alternatively, a comparator can be used to detect the end of the offset, eliminating the need for the pulse stretcher.

The bit map address counter 66 includes a line address counter 101, and column address counter 102, and a column address comparator 104. Each byte, or each image data unit, in the selected full page bit map 28 or 30 is located by row address and columns address. As the read scan of the bit map 28 or 30 progresses, the line address counter 101 is incremented by the rising edge of the line sync signal forwarded over the line sync line 88 connected thereto, while at the same time the columns address counter is incremented by an end R/W signal generated by the bit map sequencer circuit 62 and transmitted over an end R/W line 108. The addresses generated by the counters are transferred to the selected bit map 28 or 30 across the bit map address lines 56. This enables the sequential scanning of the bit map page during the read stage.

The number of data units read during each scan line is programmable, located in registers 76 and 78 enabling the print engine data interface 34 to adjust the length of the scan line through the scan offset adjust circuit 54 to accommodate paper of varying width. The column address comparator 104 detects the end address of each scan line by comparing it to the stored value from register 80. When the end of the scan line is reached, the comparator resets a line status flip-flop 110, which is part of the refresh and read/write arbitration circuit 60. Since the length of the scan line is programmable, it can be used to "image-clip" the length of a page.

The bit map sequencer 62 consists of a memory synchronizer 112 and a sequencer 114. The sequencer 114 is a state machine that samples the input and the present state of the machine to determine its next state and output. The synchronizer 112 is a clocked latch which is used to synchronize the sequencer input signals to prevent meta stable state transitions. The input to the synchronizer is from a refresh request line 116, a print/erase line 118 from register 76, (connection not shown), and a read/write request line 120. The output of the sequencer is two sets of control signals. One set is a set of bit map control signals, outputted along four bit map control lines 122, is used to access and refresh a selected bit map 28 or 30. The second set of control signals are internal to the PDI and include the end read/write signal transmitted on the end read/write line 108, an end refresh signal transmitted on an end ref line 124, an end memory access request signal transmitted on an end memory access line 126, and a write data enable signal asserted on a write data enable line 128.

The refresh and read/write arbitration logic unit 60 which controls reading, writing, and refreshing of the full page bit map memories 28 and 30 includes the line status flip-flop 110, a delay flip-flop 130, a multiplexer 132 on AND gate 134, a refresh request flip-flop 136 and a read/write request flip-flop 138. The multiplexer 132 is a 2 to 1 unit that selects one of the refresher sources from either the horizontal line processor swap request through the horizontal line processor refresh line 74 or the burst refresh through a burst refresh line 140. The line status flip-flop 110 registers the effective data period of the scan line. The output from the line status flip-flop 110 is transmitted along an inhibit refresh line 142 to the AND gate 134 and is used to inhibit refresh requests during implied refreshes. The line status flip-flop 110 may be reset by either the column address comparator 104 or by the line sync signal since they are gated together to the flip-flop 110 through an OR gate 111. The complement of the line status flip-flop 110 is used to activate a pixel counter 144 and the delay flip-flop 130. The output of the delay is in turn used to control the start of the memory cycle at each scan line. The delay is inserted to guarantee that the bit map sequencer 62 will always complete the current refresh cycle before performing a memory read scan, and that the scan adjustment between scan lines are uniform.

The refresh request flip flop 136 is asserted whenever a refresh request is received over refresh line 146 from the AND gate 134. It is deasserted at the end of a refresh cycle upon a signal from the sequencer 114 through end refresh line 124. The signal from the refresh request flip-flop 136 is asserted along the refresh request line 116 to the bit map sequencer synchronizer 112. The read/write status flip-flop 138 is asserted when a memory access request is made by a read/write request NAND gate 150 through a read/write request line 148. The flip-flop 138 is reset at the end of the memory access cycle by the end memory access signal from the sequencer 114 through the end memory access line 126. The output of this flip-flop is transmitted to the bit map sequencer synchronizer 112 through the read/write request line 120.

The parallel-to-serial converter 70 includes a write data buffer 152, a data buffer 154, and a shift register 156. All three units have the same data width of one data unit. The circuit is synchronized by the pixel counter 144 and NAND gate 150 through the branch of the read/write equal request line 148. The synchronization is achieved when the pixel counter generates an output signal by counting the print engine clock to equal a data unit (connection not shown). The signal is further conditioned by logically ANDing the pixel count with that from the delay flip-flop 130 through the NAND gate 150. The resulting signal is a shift load signal triggering the loading of the data unit into the shift register 156 to start the read/write cycle. The data buffer 154 is used to synchronize the timing of the data transfer between the bit map memory and the print engine unit when the individual data units are transferred to the print engine. The data buffer is triggered by a read signal from the read/write sequencer through the read line 158. The write buffer 152 is a tri-state buffer which stores the data pattern to be written back to the selected bit map memory 28 or 30 along the bit map data lines 68 when required by the print erase cycle. The buffer 152 is enabled by the write data enable signal asserted by the sequencer 114 through the write data enable line 128. During the scan process the retrieved data from the selected full page bit map 28 or 30 is first loaded temporarily into the data buffer 154 through the data lines 68. The data is then loaded into the shift register 156 and shifted out a bit at a time synchronously with the rising edge of the print engine clock. The print engine clock signal is transmitted to the shift register through a print engine clock line 160 and the data bits are transferred to the print engine through a video shift out line 162.

The print engine data interface 34 also includes a 4-to-2 multiplexer 164 that selects the bit map synchronous signals from either the print engine 38 or from an internal data source. In this embodiment of the invention the multiplexer accepts either the print engine line sync, through the print engine sync line 50 and the print signal engine clock through a print engine clock line 168, or signals from the PCSI through test enable and test clock lines 172, 166 selection of live sync & clock signaler selection is made over a print engine data interface test signal enable line 170 respectively. When the PDI is in the normal operation mode the print engine line sync signal is passed through to the line sync line 88, and the print engine clock signal is passed through to a clock line 96, so as to synchronize the operation of the PDI. The PCSI test lines 172, 166 are provided so the PDI can do a self-test by writing a pattern into one of the bit maps and checking the content through the horizontal line processor without the presence of the print engine.

A 20 MHz clock 174 is provided to run the bit map sequencer. The clock is converted directly to a prescaler 176 that derives a 10 MHz clock signal that is transferred to the multiplexer 164 through the test clock line 166 for the internal test, and a 1.25 MHz signal through the burst refresh line 140 to the refresh and read/write arbitration circuit 60 to provide a burst refresh signal.

The bit map refresh is achieved by one of three stages of bit map refresh control. The first stage, synchronous refresh, occurs whenever the PDI has control of a full page bit map, but that bit map is not being accessed by the print engine as a source of print command instructions. In this stage, the refresh commands come from the horizontal line processor through refresh line 74. The second stage refresh is burst mode refresh. This occurs when the PDI is in the print mode the refresh is synchronous with the internal 1.25 MHz reference clock. The burst mode refresh is inhibited during the effective bit map scan, on print engine read period, but remains active throughout the entire page scan period.

The third stage refresh is the implied refresh. This refresh takes advantage of the fact that each time a dynamic random access memory cell is accessed, the entire row the memory cell is in can be refreshed. By sequentially accessing adjacent row addresses, a memory refresh is achieved. The address bus of the PDI is arranged so that the output of the columns address counter is used to linearly address the rows of the bit map memory to achieve the refreshing. The line address counter is used to address columns of bit map memory.

The burst mode refresh is provided because for some paper configurations the scan line width is too short so the entire full page bit map may not be refreshed during an implied refresh. The burst mode refresh periodically has the data refreshed so it will be useable by the print engine. Thus, when one of the full page bit map memories is accessed by the PDI, it is able to both linearly retrieve the pixel data stored therein for transmission to the print engine, and to frequently have the data refreshed, so it remains useable. An advantage of this feature is that the bit map can be repeatedly accessed for printing multiple copies without having to spend time recomposing the page.

It is understood that this description is for the purposes of illustration. Therefore, it is intended that all matter contained in the above description or shown is the accompanying drawings be interpreted as illustrative and not limiting.

What is claimed is:

1. A print engine data interface for serially retrieving print image data from selectively addressable locations in at least one full page bit map memory and transferring the data to a print engine, and refreshing the data in the full page bit map memory, the print engine data interface comprising:
   (A) a bit map sequencer means for generating either read/write commands or refresh commands to the full page bit map memory, and a pulsed end read/write signal representative of the progression of the print engine across a scan line in response to receiving a refresh request signal, a print/erase signal, and a read/write signal, and a clock signal;
   (B) a refresh and read/write arbitration logic means for generating said refresh request signal, said read/write signal and a converter read/write signal in response to receiving an offset reset signal representative of the start of the progression of the print engine across a scan line, and a comparator signal generated when the print engine has reached the end of a scan line;
   (C) a bit map address counter means for generating selected full page bit map memory address to be subjected to said refresh commands or said read/write commands, and for generating said comparator signal in response to receiving said end read/write signal; and
   (D) a data conversion unit for accepting date forwarded from the full page bit map memory and converting the data into a data stream for reception by the print engine in response to receiving said converter read/write signal and a print engine clock signal.

2. The print engine data interface of claim 1 further including:
   (A) a set of command and data registers for storing programmed page format data and printing instructions including a print/erase instruction; and
   (B) said bit map sequencer means generating an erase command along with said read/write command to said at least one full page bit map memory in response to receiving said print/erase instruction.

3. The print engine data interface of claim 2 wherein the print engine data is arranged in said at least one full page bit map memory in a line by column array, each line of said full page bit map memory corresponding to the maximum length of a scan line, said scan lines having varying lengths, and said bit map address counter means generating said full page bit map memory addresses in a line-by-line sequencer whereby all the full page bit map column locations associated with a single memory line are addressed sequentially.

4. The print engine data interface of claim 3 further including said bit map address counter means providing said comparator signal in response to a comparison between a column value received from said command and data registers and the cumulative value of said received end read/write signals.

5. The print engine data interface of claim 3 further including a scan offset means for generating said offset reset signal in response to a comparison between a scan length value received from said command and data registers and the cumulative value of print engine clock signals that represent the progression of the print engine across a print engine line of maximum length.

6. The print engine data interface of claim 2 further including said bit map address counter means including a line address counter means for generating a line address portion of said full page bit map memory address in response to receiving a line sync signal asserted when the print engine is in movement along a scan line.

7. The print engine data interface of claim 6 further including a scan offset means for generating said offset reset signal in response to a comparison between a scan length value received from said command and data registers and the cumulative value of print engine clock signals that represent the progression of the print engine across a print engine line of maximum length.

8. The print engine data interface of claim 7 further including said scan offset reset means receiving said line sync signal, so that the rising edge of said line sync signal enables a counting of said print engine clock signals so said cumulative value of same is generated.

9. A printing system including:
   (A) a host processor means receiving printing instructions from an external source, said printing instructions including composition data representative of images to be printed and command data including instructions on how images are to be printed, and forwarding said printing instructions;
   (B) a horizontal line processor for receiving said printing instructions including said composition data from said host processor means and in response thereto generating full page bit map addresses representative of locations where printing should occur on a page;
   (C) at least one full page bit map memory having an addressable storage location for each full page bit map address said horizontal line processor may generate, for receiving said full page bit map addresses from said horizontal line processor and in response thereto storing a printing instruction in a row and column address location representative of a page location printing should occur;
   (D) a print engine data interface for sequentially accessing said full page bit map memories row and columns addresses in response to receiving a line sync signal, and for retrieving and forwarding said printing instructions stored therein;
   (E) a print engine for line scanning a media on a line-by-line basis and selectively making images thereon, and for generating said line sync during said line scan, said print engine further receiving said printing instructions from said print engine data interface, and in response thereto generate an image on the media during said line scan.

10. The printing system of claim 9 further including:
(A) a printer control and status interface means for receiving said command data from said host processor and said line sync signal from said print engine and in response thereto generating command data; and
(B) said print engine data interface means further receiving said command data from said printer control and status interface means and in response thereto accessing said bit map memory addresses in a row by row order.

11. The printing system of claim 10 further including:
(A) said print engine means generating status signals representative of its status;
(B) said printer control and status interface means receiving said printer status signals and in response thereto generating printing command signals;
(C) said print engine data interface means receiving said printer control and status interface means printing command signals and in response thereto accessing said at least one full page bit map memory for forwarding printing instructions stored therein to said print engine means.

12. The printing system of claim 10 further including:
(A) at least two full page bit map memories;
(B) said horizontal line processor means selectively generating full page bit map memory addresses to compose only one of said full page bit map memories at a time;
(C) said printer control and status interface means generating an assignment signal to said full page bit map memories; and
(C) said print engine data interface means accessing only a selected one of said full page bit map memories, said full page bit map memory selected in response to said full page bit map memories receiving said assignment signal.

13. The printing system of claim 9 further including:
(A) said printing instructions received by said host processor further including formative data;
(B) a font memory means for storing formative data and for receiving and storing formative data received by said host processor; and
(C) said horizontal line processor means generating said full page bit map addresses in response to receiving said composition data and referencing said formatting data in said font memory means.

* * * * *